United States Patent
Zahn

(10) Patent No.: US 6,415,275 B1
(45) Date of Patent: Jul. 2, 2002

(54) METHOD AND SYSTEM FOR PROCESSING RULES USING AN EXTENSIBLE OBJECT-ORIENTED MODEL RESIDENT WITHIN A REPOSITORY

(75) Inventor: Karl Theodore Zahn, Westminster, CA (US)

(73) Assignee: Unisys Corp., Blue Bell, PA (US)

( * ) Notice: Subject to any disclaimer, the term of this patent is extended or adjusted under 35 U.S.C. 154(b) by 0 days.

(21) Appl. No.: 09/368,785

(22) Filed: Aug. 5, 1999

(51) Int. Cl.[7] .............................................. G06F 17/00
(52) U.S. Cl. ......................................... 706/47; 706/45
(58) Field of Search ............................... 706/47, 48, 45

(56) References Cited

U.S. PATENT DOCUMENTS

| | | | | |
|---|---|---|---|---|
| 4,916,625 A | * | 4/1990 | Davidson et al. | 706/45 |
| 5,136,523 A | * | 8/1992 | Landers | 706/50 |
| 5,159,662 A | * | 10/1992 | Grady et al. | 706/48 |
| 5,276,776 A | * | 1/1994 | Grady et al. | 706/48 |
| 5,283,856 A | * | 2/1994 | Gross et al. | 706/47 |
| 5,485,615 A | * | 1/1996 | Wennmyr | 717/109 |
| 5,644,770 A | * | 7/1997 | Burke et al. | 706/47 |
| 5,758,031 A | * | 5/1998 | De Silva | 706/47 |
| 5,761,389 A | * | 6/1998 | Maeda et al. | 706/47 |
| 5,802,253 A | * | 9/1998 | Gross et al. | 706/47 |
| 5,809,238 A | * | 9/1998 | Greenblatt et al. | 709/202 |
| 5,870,727 A | * | 2/1999 | St. Jacques et al. | 706/11 |
| 6,182,277 B1 | * | 1/2001 | DeGroot et al. | 717/115 |
| 6,321,217 B1 | * | 11/2001 | Maeda et al. | 706/47 |

OTHER PUBLICATIONS

Suzuki et al.; "Managing the Software Design Documents with XML". Proceedings of the Sixteenth Annual International Conference on Computer Documentation, Sep. 1998, p. 127–136.*

Usdin et al.; "XML: Not a Silver Bullet, but a Great Pipe Wrench". Standardview, Sep. 1998, vol. 6, Iss. 3, p. 125–132.*

Palopoli et al.; "Generalized Production Rules as a Basis for Integrating Active and Deductive Databases". IEEE Transactions on Knowledge and Data Engineering, Nov. 1997, vol. 9, Iss. 6, p. 848–862.*

* cited by examiner

*Primary Examiner*—Thomas Black
*Assistant Examiner*—Kelvin Booker
(74) *Attorney, Agent, or Firm*—Alfred W. Kozak; Lise A. Rode; Mark T. Starr

(57) ABSTRACT

A method for processing rules using a model resident within a persistent storage means of a computer system executing a repository program. The method includes the steps of storing in the persistent storage means the model, which comprises a set of rules and a set of facts defining event states. Both of these are stored as objects. The set of rules and set of facts comprise an object-oriented representation of the model. Next, a set of commands representing an extensible inference engine are loaded as meta objects into the persistent storage. The method accepts as inputs events, which represent alterations in the set of facts and determines which of the rules is associated with the alterations in the set of facts. The most salient one of the rules determined in the preceding step is then selected and executed.

28 Claims, 11 Drawing Sheets

METHOD AND SYSTEM FOR PROCESSING RULES USING AN EXTENSIBLE OBJECT-ORIENTED MODEL RESIDENT WITHIN A REPOSITORY

CROSS REFERENCE TO RELATED APPLICATIONS

This patent document relates to the following patent applications, assigned to the same assignee hereof, which are incorporated herein by reference. {1085} U.S. Ser. No. 09/368,784, entitled A METHOD FOR MAPPING CHANGES IN SYSTEM STATE TO KNOWLEDGE-BASE OBJECTS IN A PERSISTENT REPOSITORY-RESIDENT KNOWLEDGE BASE.

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention generally relates to a method and system for enabling easy representation and processing of knowledge in the form of a set of rules stored in a repository.

BACKGROUND OF THE INVENTION

A knowledge-based system uses knowledge to solve problems. It distinguishes between knowledge itself and the knowledge interpreter, which is called an Inference Engine.

Knowledge itself can be represented by two distinct sets of information. The first set is domain-specific data about the problem and the environment, the confidence measures and the "dead ends" in the environment. The second set of information is a collection of rules that express the conditions necessary to regulate the individual pieces of data in the first set, wherein the individual pieces of data represent facts about a steady state representation of the domain.

The Inference Engine is responsible for the execution process. The Inference Engine may employ some of the following principles:

Conflict resolution strategy, which specifies what rule to "fire" or execute first. Among commonly used strategies are the last recently used rule strategy or the most recently used rule strategy, etc.

Efficient pattern matching like the Markov Algorithm, which controls the search using a predefined order of rules to "fire"; or the Rete Algorithm, which speeds up the Markov Algorithm by looking only for changes in matches rather than for every rule every time.

Execution of the Right-Hand-Side of rules, which facilitates a certain kind of prediction of the possible behavior.

All the prior art methods and systems suffer from the lack of being persistent. They employ a technique of storing the facts and rules in the form of machine-level data in the memory of the computer system. They worked by evaluating the change in the data at each memory location due to a change in the environment. This dependency on storage made the data and the governing rules susceptible to erasure when the system was shutdown or was re-booted. This technique was a major problem in environments where such a system had to constantly monitor several inputs and process them continuously.

Another problem of the prior art was that if any change in the knowledge base had to be made, the data and the relationship to rules had to be physically updated at each location in memory, which could be a tedious and time consuming process. Hence, there is a need for using a model-based approach where the user could define relationships between sets of rules and data so that any update to the knowledge base could be made by applying the update to the root objects in the knowledge base and automatically propagating the update throughout the model. It was felt that a model-based approach to representation of domains would make the task of manipulating data and rules very simple.

Still another problem with the prior art was that the implementation of the Inference Engine was not extensible. This means that a particular implementation of the Inference Engine could not be customized to manage the execution of any knowledge system other than that for which it was defined. Thus, users had to build their own Inference Engine from scratch if they wanted fundamentally different behavior in the inference engine. This required considerable time and money to be expended for a relatively minor modification from an existing version. Also, sometimes the running Inference Engine itself needed to be changed in real time when it was executing rules in a mission critical environment. This was not possible since it would mean shutting down the entire environment and then carrying out the Inference Engine change. This was a costly, if not impossible exercise.

SUMMARY OF THE INVENTION

An object of the present invention is to provide a persistent store for all the rules and data representing a knowledge base.

Another object of the invention is to provide a model-based approach to knowledge representation that includes a repository-based object-oriented model.

Still another object of the present invention is the provision of extendible capability for manipulating the rules and facts as well the functionality of the Inference Engine.

An advantage of the present invention is that all objects of the type events, rule conditions, rules, and rule groups can be versioned to facilitate unique configuration of rules and conditions that may be enabled or disabled according to their version number.

Accordingly, the user is provided with an editing History to "undo" changes to the system.

Another feature of the present invention is the provision of a rule-editing interface, which can be easily adapted to virtually any end user.

An advantage of the present invention is the provision an open API to the system so that any client application can be written or modified for accessing the Inference Engine functionality in real time.

These and other objects, features and advantages will become apparent as the invention is described in detail below, wherein a method in a computer system having a persistent storage means executes a repository program for processing rules using a model resident within the storage means. The method includes the steps of storing in the persistent storage means the model, which comprises a set of rules and a set of facts defining event states, and both of these are stored as objects. The set of rules and set of facts comprise an object-oriented representation of the model. Next, a set of commands representing an extensible inference engine are loaded as meta objects into the persistent storage. The method accepts as inputs events representing alterations in the set of facts and determines which of the rules is associated with the alterations in the set of facts. The most salient one of the rules determined in the preceding step is selected, and then executed.

Still other objects, features and advantages of the present invention will become readily apparent to those skilled in the art from the following detailed description, wherein is shown and described only the preferred embodiment of the invention, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive, and what is intended to be protected by Letters Patent is set forth in the appended claims. The present invention will become apparent when taken in conjunction with the following description and attached drawings, wherein like characters indicate like parts, and which drawings form a part of this application.

DETAILED DESCRIPTION OF ONE EMBODIMENT

Before proceeding with a description of the system and method of the present invention, a summary of Terminology used herein is provided, which may be helpful in understanding the disclosed embodiment.

An object is an abstract representation of a real-world concept or thing. For example, an object can be used to represent a customer account in a banking application. An object has features, which can be either an operation or a property. An operation defines an action that an object can perform, or an action that can be performed on the object. For example, "make withdrawal" could be defined as an operation on a customer account object. Properties indicate the state of an object. Every property of an object has a value, and it is the property values that define the state of the object. A property can be either an attribute or a reference. An attribute defines a value that is stored within the object.

For example, "current account balance" could be an attribute of the customer account object. The numeric value for the customer's account balance would be stored in the customer account object. A reference is a link or pointer to another object, and implies a relationship to that other object. A reference is typically used when it is desired not to duplicate data. For example, the customer account object could store the customer's name and address as attributes. However, if the customer opened multiple accounts, the customer's name and address would appear in multiple account objects. Therefore, it is desirable to define a separate customer object and place the name and address as attributes of the customer object. The customer account object would then contain a reference to the customer object.

A normal object program stores objects in a computer system's memory. When the program terminates, the memory used by those objects is freed and reused by other programs, making the objects that the program stored transient. An object database stores objects in a non-volatile memory, such as a computer disk. Since the information on a computer disk remains in existence, even when the computer is turned off, an object database provides the ability to persistently store objects. An object program that uses an object database thus has the option of storing objects transiently or persistently.

Figure 1:
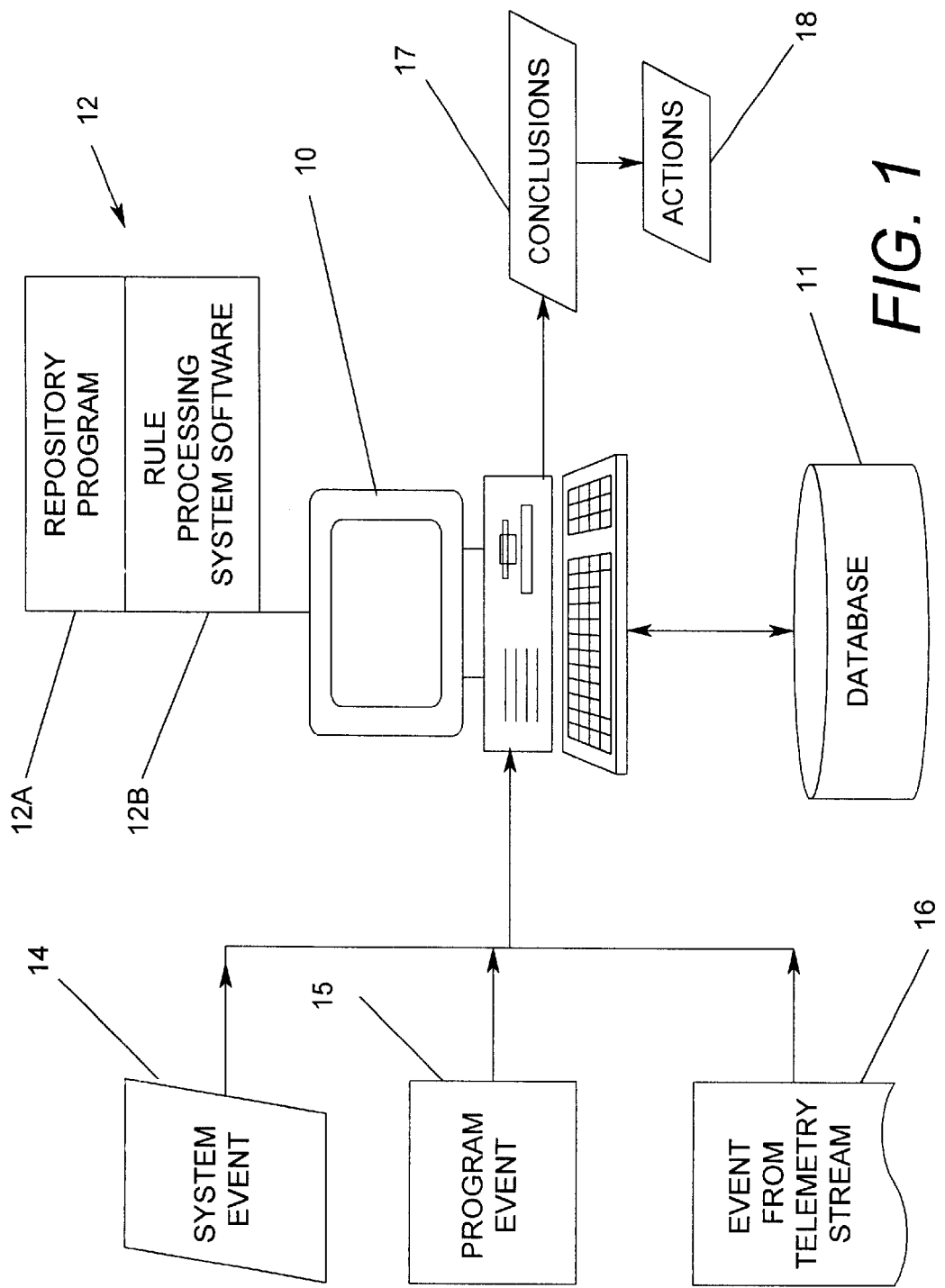
FIG. 1 is a block diagram of a system which may employ the system and method of the present invention.

Referring now to the drawings and FIG. 1 in particular, a block diagram of a system that may execute the method of the present invention is shown. A computer 10 is coupled to a database 11, and the computer 10 is capable of executing a variety of software programs 12, such as a repository program 12A and a rule processing system software 12B. In accordance with the system and method of the present invention, which will be amplified further hereinafter, the computer 10 accepts as inputs a system event 14, or a program event 15 or an event from a telemetry stream 16. By use of the rule processing system software 12B (which operates in conjunction with the repository program 12A), the computer 10 responds with conclusions 17 that lead to actions 18.

The repository 12A further includes tools for cataloging, browsing, and managing components that make up an application. Methods to support these services are disclosed in several patents and patent applications assigned to the assignee of this application, including U.S. Pat. No. 5,671,398 for METHOD FOR COLLAPSING A VERSION TREE WHICH DEPICTS A HISTORY OF SYSTEM DATA AND PROCESSES FOR AN ENTERPRISE; U.S. Pat. No. 5,644,764 for METHOD FOR SUPPORTING OBJECT MODELING IN A REPOSITORY; U.S. Pat. No. 5,581,755 for METHOD FOR MAINTAINING A HISTORY OF SYSTEM DATA AND PROCESSES FOR AN ENTERPRISE; U.S. Pat. No. 5,557,793 for IN AN OBJECT ORIENTED REPOSITORY, A METHOD FOR TREATING A GROUP OF OBJECTS AS A SINGLE OBJECT DURING EXECUTION OF AN OPERATION; U.S. Pat. No. 5,889,992 for A METHOD FOR MAPPING TYPES IN A MODEL IN AN OBJECT-ORIENTED REPOSITORY TO LANGUAGE CONSTRUCTS FOR A C BINDING FOR THE REPOSITORY; U.S. Pat. No. 5,721,925, for METHOD FOR GENERICALLY INVOKING OPERATIONS IN AN OBJECT ORIENTED REPOSITORY; U.S. Pat. No. 5,848,273 for A METHOD FOR GENERATING OLE AUTOMATION AND IDL INTERFACES FROM METADATA INFORMATION; U.S. Pat. No. 5,765,039 for A METHOD FOR PROVIDING OBJECT DATABASE INDEPENDENCE IN A PROGRAM WRITTEN USING THE C++ PROGRAMMING LANGUAGE; U.S. Pat. No. 5,758,348, for A METHOD FOR GENERICALLY MANIPULATING PROPERTIES OF OBJECTS IN AN OBJECT ORIENTED REPOSITORY; U.S. Pat. No. 5,701,472, for A METHOD FOR LOCATING A VERSIONED OBJECT WITHIN A VERSION TREE DEPICTING A HISTORY OF SYSTEM DATA AND PROCESSES FOR AN ENTERPRISE; pending application Ser. No. 08/655,553, filed on May 30, 1996, for A METHOD FOR PACKING/UNPACKING C OPERATIONS TO/FROM RPC COMPATIBLE FORMAT USING THE RPC PROTOCOL TO OPERATE REMOTELY WITH AN OBJECT-ORIENTED REPOSITORY, each of which are hereby incorporated by reference as if set forth in full herein.

Figure 2:
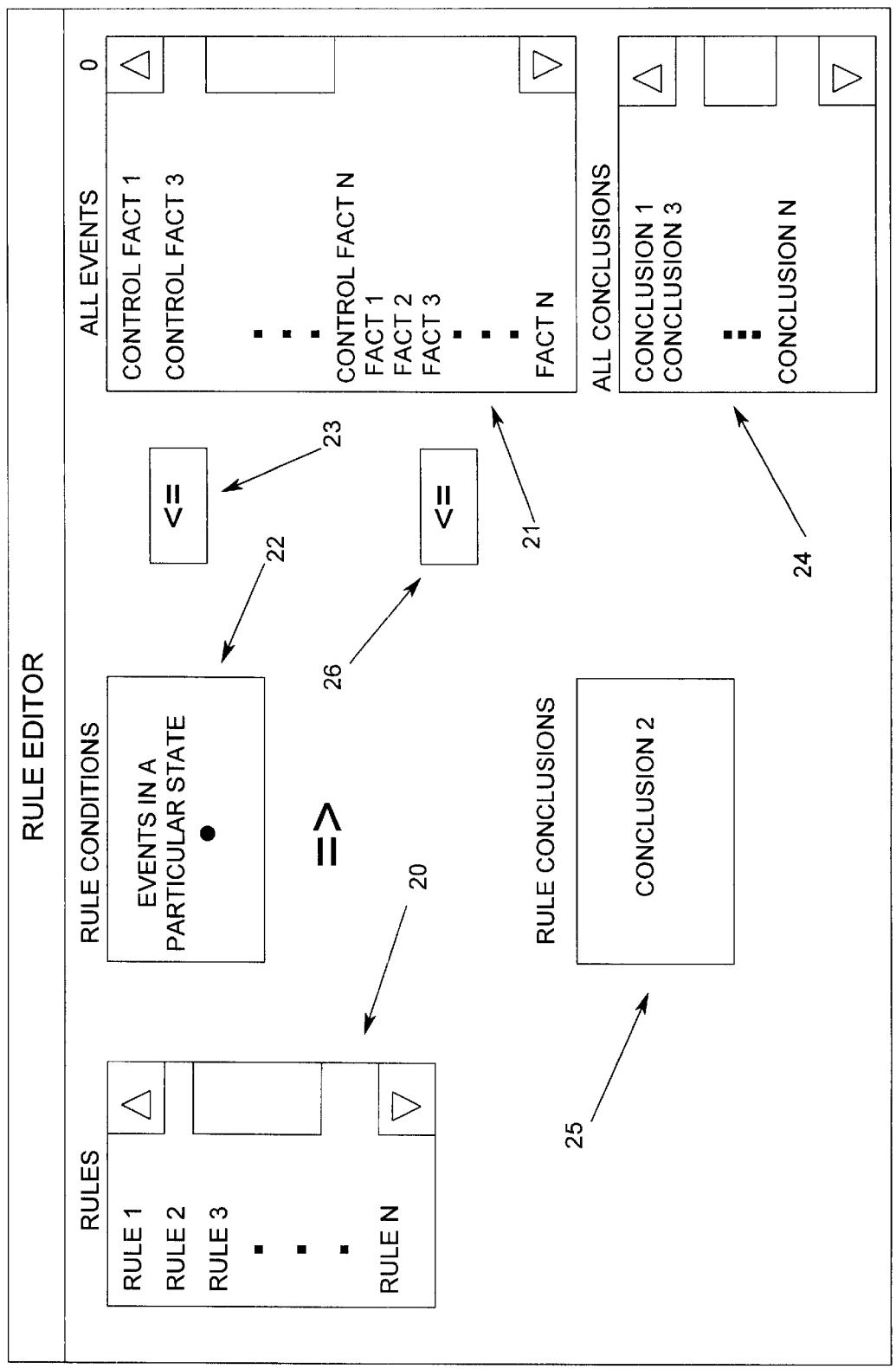
FIG. 2 is a diagram of a screen illustrating a user's GUI Rule Editor of the system and method of the present invention.

Referring now to FIG. 2, a computer display screen is shown that illustrates the user's GUI interface for using the system and method of the present invention. A Rules window 20 displays a set of Rules that, together with component objects, define the knowledge-base of a model-based representation of any domain. The window 20 allows the user to select any rule. An Events window 21 displays a set of Events that make up all the events used as inputs by the model-based representation of the domain. Window 21 also allows the user to select Events and place them in a Rule Conditions window 22 by clicking on a button 23 after the event has been selected. The Events placed in the Rule Conditions window 22, which are Events in a particular state, may be used to qualify any Rule selected from the Rules Window 20. For the set of Events (specified as conditions in the Rule Condition window 22 and the Rule selected in Rules Window 20) that those conditions qualify, a set of Conclusions that can be inferred by the rule can be specified by selecting the appropriate conclusions from an All Conclusions window 24 and placing them in a Rule Conclusions window 25 by clicking on a button 26 with the conclusion selected in window 24.

Figure 3:
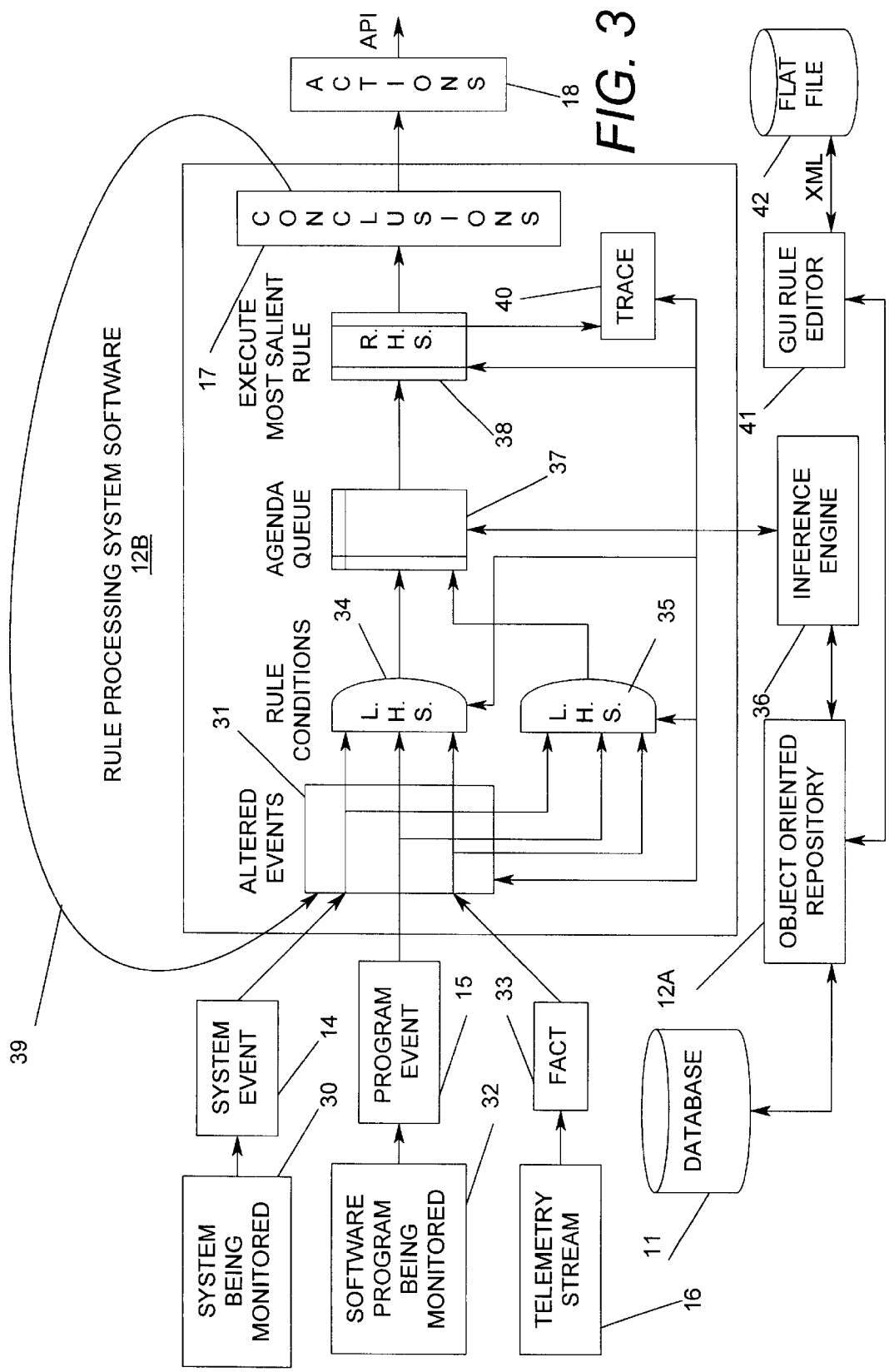
FIG. 3 is a module block diagram of the system and method of the present invention.

Referring now to FIG. 3, a block diagram illustrates the rule processing system software 12B in greater detail. A system 30 being monitored generates a System Event 14, which is detected by an Altered Events module 31. Similarly, a software program 32 being monitored generates a Program Event 15, which is also detected by the Altered Events module 31. Moreover, a fact 33 from the Telemetry Stream 16 being monitored is detectable by the Altered Events module 31. The Altered Events module retains a list of events that have changed state. The list of changed events in the Altered Events module 31 is applied to a set of rules 34 and 35, associated with the changed events. The AND gate depicts that for a rule to be satisfied all its rule conditions must be met simultaneously. This testing of rule conditions against changed events is gated by the output from an Inference Engine 36 operating in conjunction with the Repository 12A.

Rules that have been satisfied are passed on as inputs to an AgendaQueue 37, which is also gated by the Inference Engine 36. The AgendaQueue 37 determines the rule with the highest saliency among all the rules in the AgendaQueue. The most salient rule in the AgendaQueue is provided as an input to an Execute Most Salient Rule module 38. The module 38 is also gated by the Inference Engine 36. Execution of the Right Hand Side of the most salient rule, by module 38, infers a set of conclusions shown here as the Conclusions module 17. The conclusions invoke a set of Actions shown here as the Actions module 18. The Actions module represents some action being performed on the System 30, the Software Program 32 or the Telemetry Stream 16. Also, a feedback loop 39 from the Conclusions module 17 is provided as an input to the Altered Events module 31, and an API is illustrated as an output from the Actions module 18. The feedback loop 39 signifies that an action may result in an event change, which may qualify other rule conditions resulting in processing other rules in a similar manner to that described above.

A Trace Tool module 40 is responsible for keeping a log of all the rules which have been executed. In a situation where an unexpected action occurs, this tracing facility enables the user to trace back the sequence of rule executions that led to that action. This tracing module is controlled by setting its attributes from the API. A GUI Rule Editor 41 is disposed for use by a user who may want to control the running of the Inference Engine, or set up the rules and facts representing the knowledge-base in the repository. The Flat File 42 stores a model-based representation of the set of rules, events, conditions and conclusions that make up the knowledge base. Instead of setting up the knowledge base from the GUI Editor, the user has the option of setting up the knowledge base by importing it as an XML Stream from the flat file into the Repository.

Figure 4:
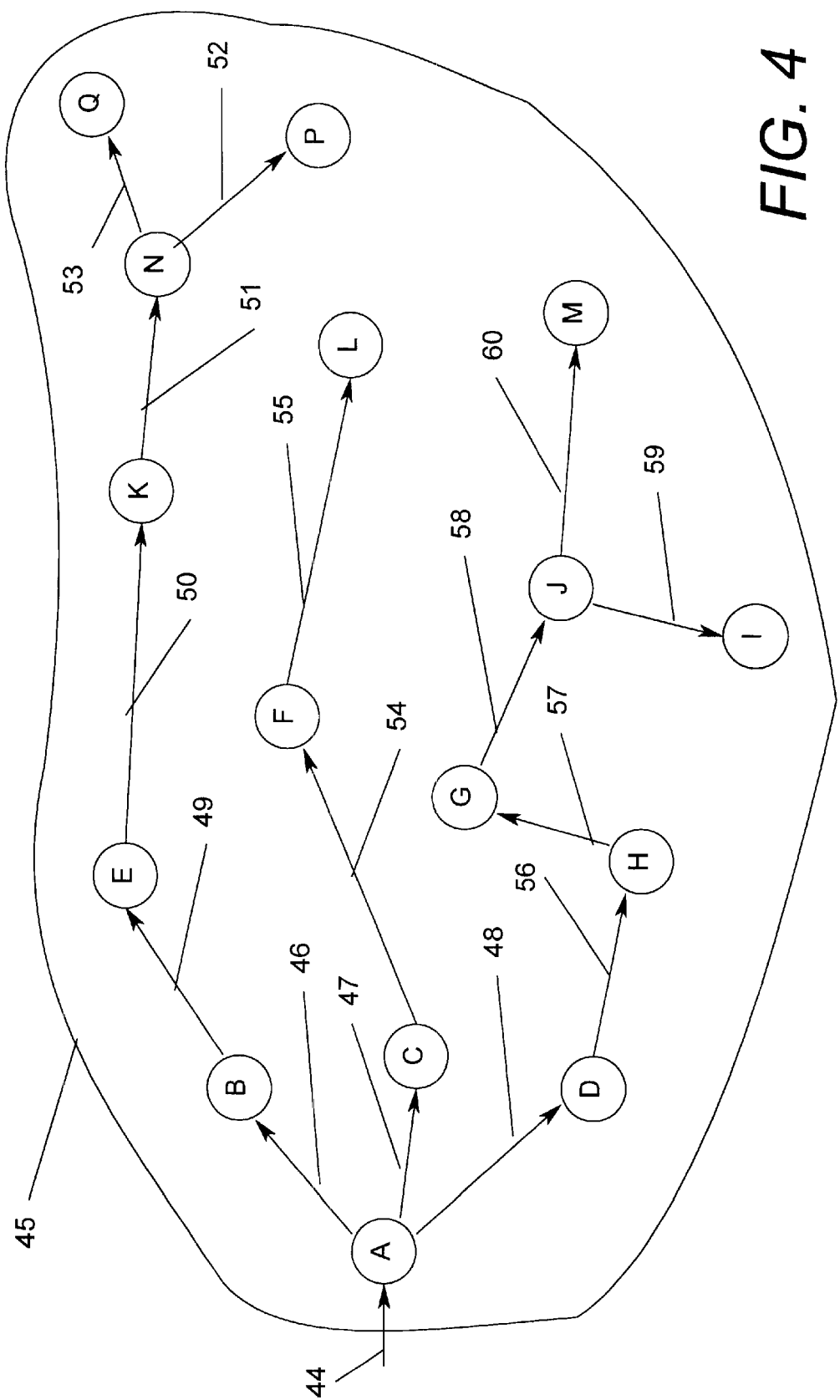
FIG. 4 is a conceptual diagram illustrating the parallel operation of the object-oriented rules-based system and method of the present invention.

Referring now to FIG. 4, a node relationship diagram illustrates the concept of parallel analysis within a given domain space 45, wherein an event change 44 triggers execution of Rule A. The actions invoked by the Right Hand Side of Rule A results in events 46, 47 and 48, leading to Execution of Rules B, C and D, respectively. Rule B invokes event 46, which leads to execution of Rule E; and Rule E invokes event 50 leading to execution of Rule K. Rule K invokes event 51 leading to execution of Rule N, which in turn invokes events 52 and 53, leading to execution of Rules P and Q. At the same time, or in parallel, Rule C invokes event 54 leading to execution of Rule F, which invokes event 55 thereby leading to execution of Rule L. Likewise at the same time, Rule D invokes event 56, which leads to execution of Rule H. Rule H invokes event 57, which leads to execution of Rule G, which invokes event 58 leading to execution of Rule J. Rule J invokes events 59 and 60, which leads to execution of Rules I and M, respectively.

Figure 5:
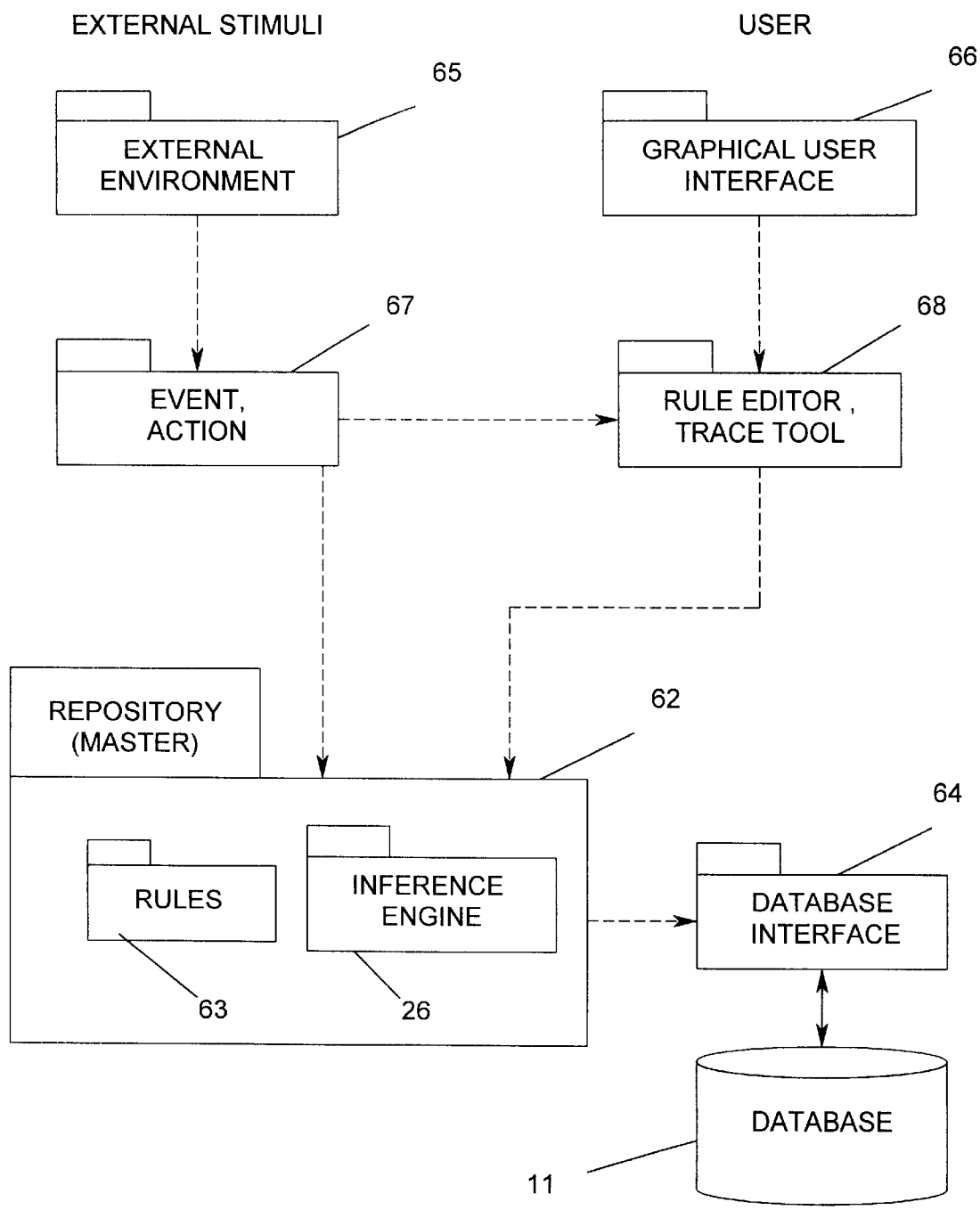
FIG. 5 is a UML-type package diagram illustrating the system and method of the present invention.

Referring now to FIG. 5, a UML-type package diagram illustrating the functional components of the system and method of the present invention is shown. A Master Package 62 incorporates a repository resident, persistent set of Rules 63 and the extensible Inference Engine 26. This forms the core of the invention disclosed herein, in that it is a Persistent repository-resident, Extensible, Model-based representation of a knowledge-base and an Inference Engine that can be extended or modified by an open GUI to meet any specific needs of a user. A database interface 64 couples the database 11 to the repository incorporated in master package 62. Classes contained in packages 65 and 67 together represent the interface of the Master package with the domain whose knowledge-base is represented by the persistent set of rules in the repository. Similarly, classes contained within packages 66 and 68 together represent the interface of the Master Package with the user, who can either set up the persistent set of rules in the repository or control the Extensible Inference Engine through a GUI. Package 68 also allows the user to trace the sequence of actions taken by the Rule Processing System ("RPS") since the Tracing Tool maintains a log of all the actions taken by the RPS.

Figure 6:
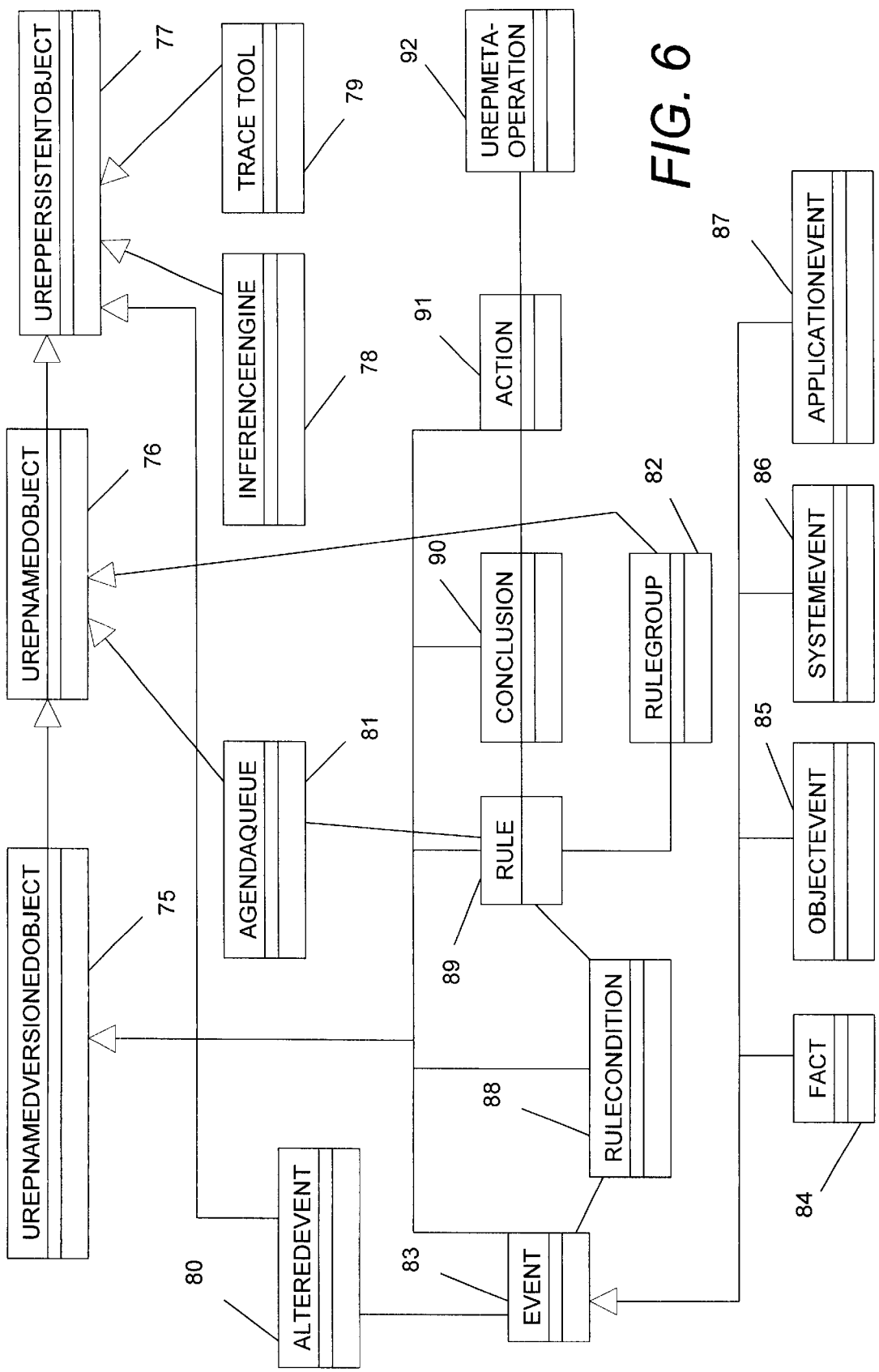
FIG. 6 is a UML-type class diagram illustrating the repository-resident system and method of the present invention.

Referring now to FIG. 6, a UML-type class diagram illustrates the functional components of the system and method of the present invention. Within the Repository 12A, a NamedVersioned Object 75, a Named Object 76 and a Persistent Object 77 are created. The Persistent Object 77 is a super-class from which are derived an Inference Engine class 78, a Trace Tool class 79 and an Altered Event class 80.

The extensible class 78 represents the Inference Engine 36 (FIG. 3). Its operations include RUN, HALT, SINGLESTEP, RESET, CYCLE, CLEAR, RUN, CONTINUOUS, and FINDSTARTUPRULES. All these operations are extensible in that the user can extend these operations to create operations specific to his needs. They are persistent in that they remain stored in the repository and their state is preserved even if the system is shut down. The class 79 includes the operation TRACE, which maintains a log of all the actions to be taken by the RPS. The class 80 instantiates an Altered Events object that retains all the event changes as shown in module 31 (FIG. 3). The NamedVersion class 76 is a super-class that derives an AgendaQueue class 81 and a RuleGroup class 82. An Instance of the AgendaQueueclass 81 is a list of rules that are queued for execution. Rules are placed on the AgendaQueue when their rule-conditions are determined to have been met. This class has the operations CLEAR, SYNC, and SELECTRULE and is shown by the AgendaQueue module 37 (FIG. 3). An instance of the RuleGroup class 82 can be viewed as a container of a set of rules referring to similar event changes. The user is allowed to add or remove rules from the set of rules contained in that instance. This class also allows the user to enable or disable the entire set of rules contained in an instance of that class. Thereby giving the user the option to enable or disable distinct sets of rules for execution depending on the event changes to be monitored. An object of the RuleGroup Class has the Operations addRULE,removeRULE, ENABLE, DISABLE, STATUS, Construct.

The Persistent Object 77 derives the Altered Event class 80. A single instance of this class retains the events that have changed state. Thus, an instance of the AlteredEvents class is Associated with one or more instances of the Event class 83 that have been Altered. The Event Class 83 is itself a super-class of a Fact class 84, an Object Event class 85, a System Event class 86 and an Application Event class 87. Respective Objects of these subclasses of the Event class are instantiated when an input to the RPS, from either a System or an Application or a Telemetry Stream, changes state.

Each instance of the Event class 83 qualifies one or more associated instances of the RuleCondition class 88. This means that a change of state, from either a system or application or a telemetry stream, can qualify as satisfied or unsatisfied one or more associated rule conditions. An operation of the RuleCondition class is TEST and an attribute is SATISFIED.

One or more instances of the RuleCondition class 88 also qualifies an instance of the Rule class 89. Thus Rule Conditions represent the constraints that must be satisfied for the rule to be satisfied and ultimately placed on the AgendaQueue. A rule is the control of the system. Rules consist of a Left Hand Side (L.H.S.), which are the rule conditions; and, a Right Hand Side (R.H.S.), which are the conclusions.

Whenever the conditions of the rule are met, a set of conclusions are drawn. As an example: whenever you see a red traffic light, you should stop. Thus, each instance of the Rule Class 89 infers one or more instances of the Conclusion class 90. Also, a rule belongs to one or more RuleGroups. Thus, each instance of the Rule Class 89 belongs to one or more instances of the RuleGroup Class 82. Rules that have been satisfied are placed on the AgendaQueue. Hence, a satisfied instance of the Rule Class 89 is retained by the agenda of an instance of the AgendaQueue class 81. The Rule Class has attributes ENABLED, SATISFIED, and SALIENCE and has operations FIRE, DISABLE, RESET, INSTANTIATE, UNINSTANTIATE, EVALUATE. The salience attribute allows the user to specify the importance of a rule at the time of modeling the rule-based knowledge system. This attribute can take on five values: Most salient, Salient, Normal, Less Salient, Least Salient. The relative Saliency of instances of the Rule Class placed on the AgendaQueue is used to determine the rule that should be executed first. This step is illustrated in greater detail in FIG. 10 and amplified further hereinbelow.

When an instance of the Rule Class 89 (selected for execution as described in FIG. 10) is fired, it instantiates one or more instances of the Conclusion Class 90. Each instance of the Conclusion Class 90 invokes an instance of the Action Class 91; and, the instance of the Action Class 91 executes one or more instances of the Meta Operation Class 92. The Event class 83, the Rule Condition class 88, the Rule class 89 and a Conclusion class 90, an Action class 91 and a Meta Operation class 92 are all sub-classes of and included in the NamedVersion Object class 75.

Figure 7A:
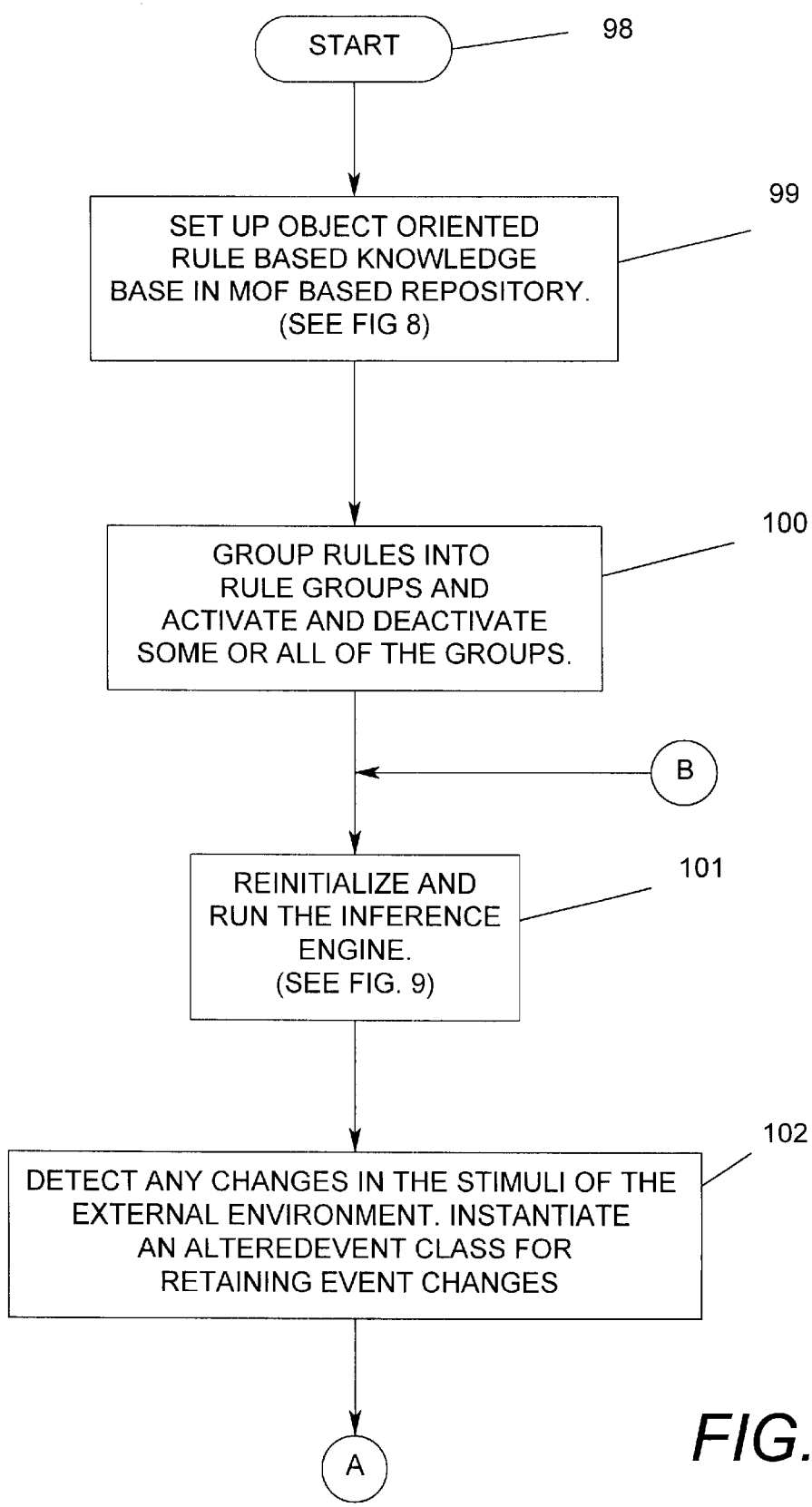
FIGS. 7A and 7B combined form a high-level flow chart of the method of the present invention.

Referring now to FIG. 7A, the first of a two-sheet flow-chart illustration of the method of the present invention is shown. The process begins with a start bubble 98 followed by a step of setting up an object-oriented rule-based knowledge base in a MOF-based repository (block 99). This step is illustrated in greater detail in FIG. 8 and amplified further hereinbelow. After this, the rules are grouped into Rule Groups; and, as described in the explanation for FIG. 6, some or all of the groups are activated or deactivated in accordance with the events that the user needs to monitor (block 100). The Inference Engine is re-initialized and run (block 101). This step is shown in greater detail in FIGS. 9 and amplified further hereinbelow. Next, any changes in the stimuli of the external environment are detected; and, an AlteredEvent class is instantiated for retaining event changes (block 102). This latter step is described in greater detail in the above-cited co-pending application entitled A METHOD FOR MAPPING CHANGES IN SYSTEM STATE TO KNOWLEDGE-BASE OBJECTS IN A PERSISTENT REPOSITORY-RESIDENT KNOWLEDGE BASE, Serial No. 09/368,784 (1085), filed Aug. 5, 1999. The process illustration continues in FIG. 7B as denoted by a connector A.

Figure 7B:
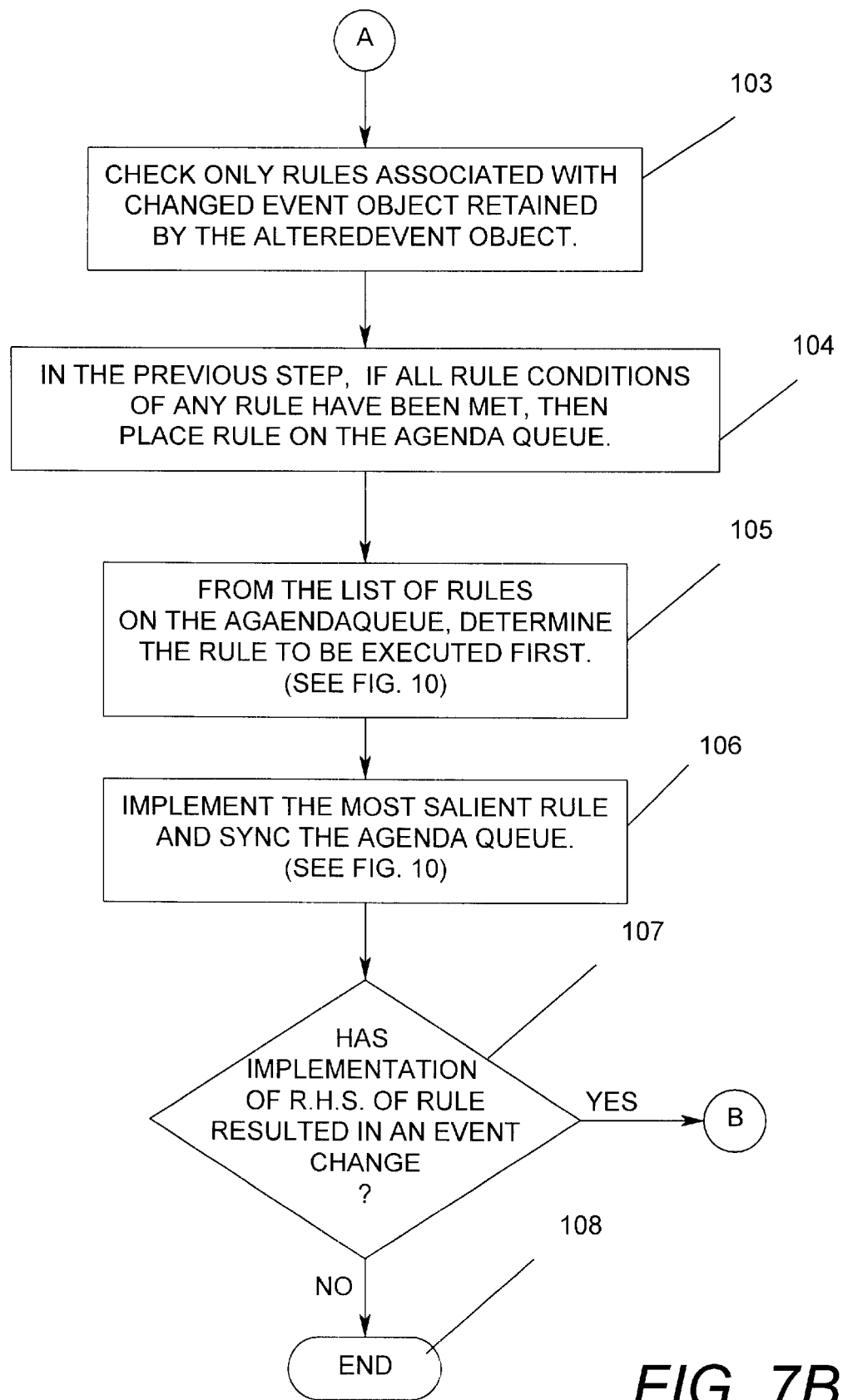

Referring now to FIG. 7B at the connector A, a check is made for only those rules associated with each changed event object retained by the Altered Event object (block 103); and, if all rule conditions of any rule have been met, then the rule is placed in the Agenda Queue (block 104). These latter steps 103 and 104 are described in greater detail in the above-cited co-pending application Ser. No. 09/368,784 (1085). After this, from the list of rules on the Agenda Queue ,the rule to be executed is determined (block 105), and is then "fired" and the Agenda Queue is synched (block 106). These latter steps 105 and 106 are shown in greater detail in FIG. 10 and amplified further hereinbelow. An inquiry is next made as to whether or not execution of the Right Hand Side of the rule has resulted in an event change (diamond 107). If the answer to this inquiry is yes, then a return is made back to the step depicted by the block 101 (FIG. 7A) as denoted by a connector B. On the other hand, if no modifications have been made the process ends (bubble 108).

Figure 8:
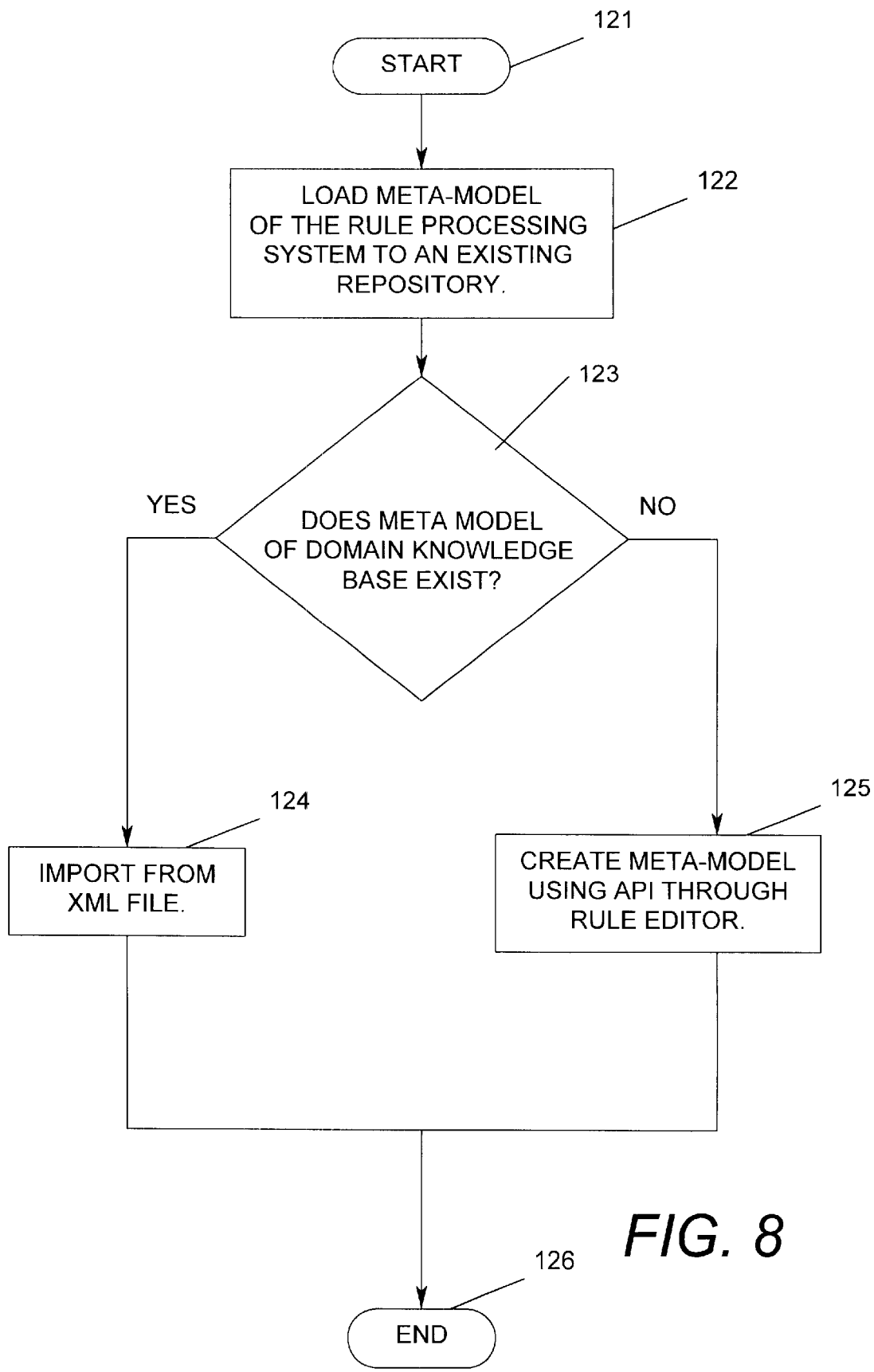
FIG. 8 is a flow chart of the set-up process for an object-oriented rule-based knowledge base in a MOF repository.

Referring now to FIG. 8, a flow chart of the knowledge-base representation process for setting up the object-oriented rule based knowledge in a MOF-based repository is shown. The process begins with a start bubble 121 followed by a step of loading the meta-model of the rule processing system into a repository (block 122). Next, an inquiry is made as to whether or not a meta model of the domain knowledge base exists (diamond 123). If the answer to this inquiry is yes, then the XML file for this meta model is imported (block 124). On the other hand, if the answer to this inquiry is no, then a meta model is created using a standard open API through the Rule editor (block 125). Upon completion of either step 124 or 125, the process ends (bubble 126).

Figure 9:
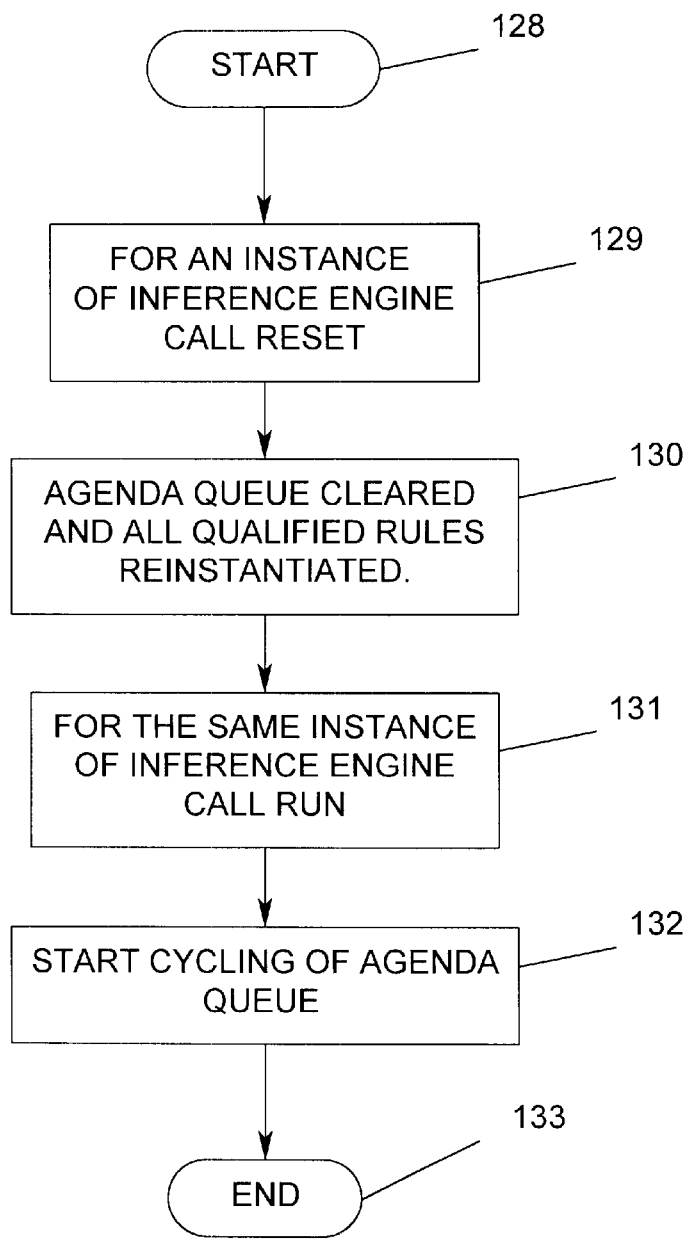
FIG. 9 is a flow chart of the process for re-initializing the Inference Engine.

Referring now to FIG. 9, a flow chart of the process for re-initializing and running the Inference Engine is shown. The process begins with a start bubble 128 followed by a step of calling Reset for an instance of the Inference Engine (block 129). This signals to the Inference Engine that the process of running the Rule Processing System is about to begin. The Reset operation on the Inference Engine causes the Agenda Queue to be cleared. This means that all rule entries listed on the Agenda Queue are deleted and the Queue is readied for a fresh cycle of the RPS. Reset also causes all qualified Rules to be re-instantiated (block 130) which means that all the rule instances, defined in the model stored in the repository, are tested. After this, Run is called for the same instance of the Inference Engine (block 131); and cycling of the Agenda Queue is begun (block 132). Run starts the knowledge processing and cycling refers to the process of determining the rule to be fired from the list of rules on the Agenda Queue. The initialization process ends in bubble marked 133.

Figure 10:
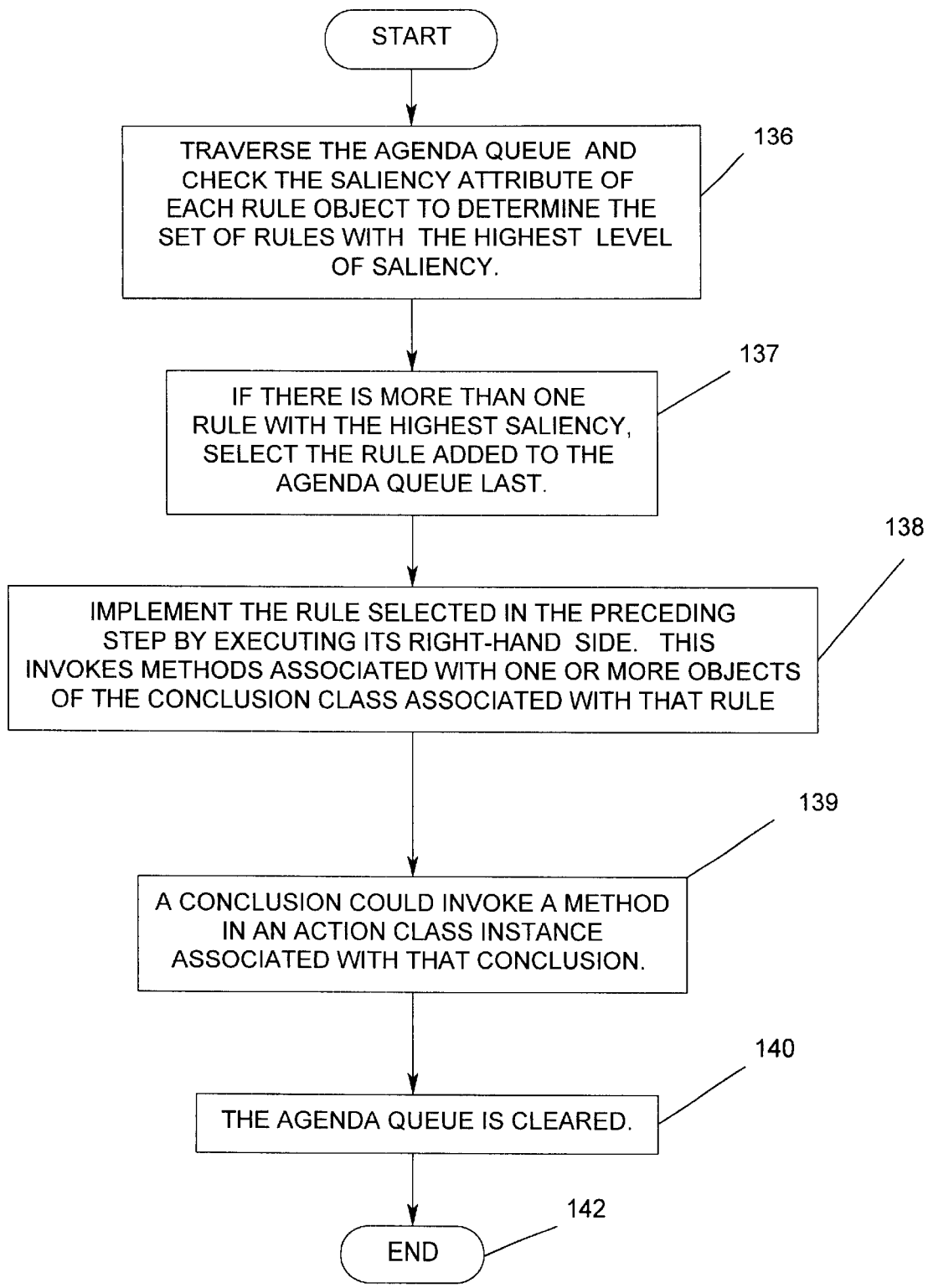
FIG. 10 is a flow chart of the process for clearing the agenda queue.

Referring now to FIG. 10, a flow chart of the process for determining the Rule to be executed is shown. The process starts with the start bubble 136 followed by the step of traversing the Agenda Queue. The saliency attribute of each rule object is checked to determine the set of Rules with the highest level of saliency (block 136). Next, if there is more than one Rule in the set of rules with the highest saliency level, then the Rule from this set that has been added to the Agenda Queue last is selected for execution(block 137). After this, the rule selected in the preceding step is implemented by executing the Right-Hand-Side ("RHS") of the rule (block 138). That is, methods associated with one or more objects of the Conclusion class associated with that Rule are invoked. After this, a conclusion could invoke a method in an Action class instance associated with that conclusion (block 139); and, the Agenda Queue is cleared (block 140). the process ends in bubble 142.

The methods and apparatus of the present invention, or certain aspects or portions thereof, may take the form of program code (i.e., instructions) embodied in tangible media, such as floppy diskettes, CD-ROMS, hard drives, or any other machine-readable storage medium, wherein, when the program code is loaded into and executed by a machine, such as a computer, the machine becomes an apparatus for practicing the invention. The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

Although the invention has been described with reference to a specific embodiment, this description is not meant to be construed in a limiting sense. Various modifications of the disclosed embodiment as well as alternative embodiments of the invention will become apparent to one skilled in the art upon reference to the description of the invention. It is therefore contemplated that the appended claims will cover any such modifications of embodiments that fall within the true scope of the invention.

What is claimed is:

1. In a computer system executing a repository program and having a persistent storage means, a method for processing rules using a model resident within said storage means, said method comprising the steps of:
   a. storing in said persistent storage means said model comprising a set of rules and a set of facts defining event states, both of which are stored as objects, wherein said set of rules and said set of facts comprise an object-oriented representation of said model;
   b. loading as meta objects in said persistent storage a set of commands representing an extensible inference engine;
   c. accepting as inputs to said method events representing alterations in said set of facts;
   d. determining which of said rules is associated with said alterations in said set of facts;
   e. selecting the most salient one of said rules determined in the preceding step; and,
   f. executing said most salient rule selected in the preceding step, said executing further comprising implementing the right-hand side of the rule selected in step e.

2. The method as in claim 1 wherein any event change is sensed and processed to check if there are any rules affected, wherein a subsequent implementation of a rule results in an action.

3. The method as in claim 2 wherein said inputs comprise events occurring as result of said action.

4. The method as in claim 1 further including the step of tracing all rules executed and conclusions reached.

5. The method as in claim 1 wherein said step of loading as meta objects includes defining operations that may be adapted by a user for customizing execution of said method.

6. The method as in claim 1 wherein said step of accepting as inputs further includes sensing changes in system state.

7. The method as in claim 1 wherein said inputs comprise events occurring in software programs being monitored by said method.

8. The method as in claim 1 wherein said inputs comprise events occurring in a telemetry stream being monitored by said method.

9. The method as in claim 1 wherein said inputs comprise events occurring in a computer system being monitored by said method.

10. The method as in claim 1 wherein said step of selecting further comprises sorting in order of saliency rules which have been satisfied.

11. The method as in claim 10 wherein said step of sorting further includes determining from those rules with the highest saliency which rule was added last to list of satisfied rules and using this last rule for execution.

12. The method as in claim 1 wherein said step of storing said model further comprises importing said model from a UML-based modeling tool as a standard XML file.

13. The method as in claim 1 wherein said step of storing said model further comprises entering said rules from a rule editing interface, which may be easily adapted to any end user.

14. The method as in claim 1 further comprising the step of interfacing said method through an open API so that any client application can be written or modified for accessing functionality of said method.

15. A storage medium encoded with machine-readable computer program code for processing rules in a computer system executing a repository program and having a persistent storage means, using a model resident within said storage means, wherein, when the computer program code is executed by a computer, the computer performs the steps of:

a. storing in said persistent storage means said model comprising a set of rules and a set of facts defining event states, both of which are stored as objects, wherein said set of rules and said set of facts comprise an object-oriented representation of said model;

b. loading as meta objects in said persistent storage a set of commands representing an extensible inference engine;

c. accepting as inputs to said method events representing alterations in said set of facts;

d. determining which of said rules is associated with said alterations in said set of facts;

e. selecting the most salient one of said rules determined in the preceding step; and, f. executing said most salient rule selected in the preceding step, said executing further comprising implementing the right-hand side of the rule selected in step e.

16. A storage medium as in claim 15 wherein any event change is sensed and processed to check if there are any rules affected, wherein a subsequent implementation of a rule results in an action.

17. A storage medium as in claim 16 wherein said inputs comprise events occurring as a result of said action.

18. A storage medium as in claim 15 further including the step of tracing all rules executed and conclusions reached.

19. A storage medium as in claim 15 wherein said step of loading as meta objects includes defining operations that may be adapted by a user for customizing execution of said method.

20. A storage medium as in claim 15 wherein said step of accepting as inputs further includes sensing changes in system state.

21. A storage medium as in claim 15 wherein said inputs comprise events occurring in software programs being monitored by said method.

22. A storage medium as in claim 15 wherein said inputs comprise events occurring in a telemetry stream being monitored by said method.

23. A storage medium as in claim 15 wherein said inputs comprise events occurring in a computer system being monitored by said method.

24. A storage medium as in claim 15 wherein said step of selecting further comprises sorting in order of saliency rules which have been satisfied.

25. A storage medium as in claim 24 wherein said step of sorting further includes determining from those rules with the highest saliency which rule was added last to listed of satisfied rules and using this rule for execution.

26. A storage medium as in claim 15 wherein said step of executing further comprises implementing the right-hand side of the rule selected in step e thereof.

27. A storage medium as in claim 15 wherein said step of storing said model further comprises importing said model from a UML-based modeling tool as a standard XML file.

28. A storage medium as in claim 15 wherein said step of interfacing said method through an open API so that any client application can be written or modified for accessing functionality of said method.

\* \* \* \* \*